(12) United States Patent
Truelsen et al.

(10) Patent No.: US 12,070,101 B2
(45) Date of Patent: *Aug. 27, 2024

(54) ARTICLE OF FOOTWEAR

(71) Applicant: ECCO SKO A/S, Bredebro (DK)

(72) Inventors: Ejnar Truelsen, Bredebro (DK); Frank Jensen, Bredebro (DK)

(73) Assignee: ECCO Sko A/S, Bredebro (DK)

( * ) Notice: Subject to any disclaimer, the term of this patent is extended or adjusted under 35 U.S.C. 154(b) by 232 days.

This patent is subject to a terminal disclaimer.

(21) Appl. No.: 17/127,361

(22) Filed: Dec. 18, 2020

(65) Prior Publication Data

US 2021/0186144 A1    Jun. 24, 2021

(30) Foreign Application Priority Data

Dec. 20, 2019 (EP) .................................. 19218810

(51) Int. Cl.
*A43B 7/14* (2022.01)
*A43B 7/1475* (2022.01)
(Continued)

(52) U.S. Cl.
CPC .......... *A43B 7/1475* (2013.01); *A43B 7/1495* (2013.01); *A43B 13/04* (2013.01);
(Continued)

(58) Field of Classification Search
None
See application file for complete search history.

(56) References Cited

U.S. PATENT DOCUMENTS

| 5,940,990 A * | 8/1999 | Barret | A43B 5/002 36/55 |
| 6,401,366 B2 * | 6/2002 | Foxen | A43B 7/1495 36/102 |

(Continued)

FOREIGN PATENT DOCUMENTS

| CN | 101304674 | 11/2008 |
| CN | 106539186 | 3/2017 |
| GB | 2258801 A | 2/1993 |

OTHER PUBLICATIONS

European Search Report dated May 27, 2-020 from the European Patent Office in EP Application No. 19218810.

(Continued)

*Primary Examiner* — Jila M Mohandesi
(74) *Attorney, Agent, or Firm* — Lee & Hayes, P.C.

(57) ABSTRACT

An article of footwear, comprising: an upper having an outer surface, a foot insertion volume and a sole facing surface, a sole assembly comprising: a midsole having a foot facing surface, a ground facing surface, a heel region, forefoot region and an arch region between the heel region and the forefoot region in a longitudinal direction, where the midsole in the arch region comprises a medial support element covering at least a part of the cuboid bone of the foot and/or a lateral support element covering at least a part of the navicular bone, a medial reinforcement member positioned medial to the medial support element and/or a lateral reinforcement member positioned lateral to the lateral support element, where the medial and/or the lateral reinforcement member is configured to increase the rigidity of the medial support element and/or the lateral support element.

20 Claims, 4 Drawing Sheets

(51) Int. Cl.
   *A43B 13/04* (2006.01)
   *A43B 13/12* (2006.01)
   *A43B 13/18* (2006.01)
   *B29D 35/00* (2010.01)

(52) U.S. Cl.
   CPC .......... *A43B 13/125* (2013.01); *A43B 13/184* (2013.01); *B29D 35/0009* (2013.01)

(56) References Cited

U.S. PATENT DOCUMENTS

| | | | |
|---|---|---|---|
| 6,701,643 B2* | 3/2004 | Geer | A43B 17/08 36/97 |
| 7,444,767 B2 | 11/2008 | Kilgore et al. | |
| 8,474,153 B2* | 7/2013 | Brie | A43B 3/18 36/103 |
| 2006/0277798 A1* | 12/2006 | Reilly | A43B 7/143 36/108 |
| 2012/0124865 A1* | 5/2012 | Opie | A43B 5/18 36/73 |
| 2014/0245700 A1* | 9/2014 | Bushby | A43B 7/226 83/13 |
| 2014/0259789 A1 | 9/2014 | Dojan et al. | |
| 2015/0013185 A1 | 1/2015 | Elder | |
| 2017/0360141 A1* | 12/2017 | Azoulay | A43B 11/00 |
| 2018/0064200 A1* | 3/2018 | Apostolopoulos | A43B 5/18 |
| 2019/0200700 A1 | 7/2019 | Hale | |

OTHER PUBLICATIONS

Chinese Search Report for corresponding Chinese Patent Application No. 202011510462X, dated Dec. 14, 2023, 2 pages.
EPO Communication for corresponding EP Patent Application No. 19218810.0 dated Apr. 23, 2024, 5 pages.
EPO Communication for corresponding EP Patent Application No. 19218828.2 dated Apr. 23, 2024, 5 pages.

* cited by examiner

ARTICLE OF FOOTWEAR

TECHNICAL FIELD

An article of footwear comprising: an upper having an outer surface, a foot insertion volume and a sole facing surface, and a sole assembly comprising: a midsole having a foot facing surface, a ground facing surface, a heel region, forefoot region and an arch region between the heel region and the forefoot region in a longitudinal direction, where the midsole in the arch region comprises a medial support element covering at least a part of the cuboid bone of the foot and/or a lateral support element covering at least a part of the navicular bone.

BACKGROUND

When manufacturing articles of footwear, and especially shoes, there it may often be necessary to reinforce a certain part of the upper in order to provide support to the foot when the shoe is being worn. The support is often positioned in the area between the lacing area and the outsole, where the support is adapted to strengthen the upper so that the material of the upper does not stretch and deform when the laces are tightened. The support element may be a tensioning device which stretches from the laces towards the sole, and this provides a support to the instep of the foot of the user.

This reinforcement may however limit the design options for uppers, which means that uppers need to be designed in a certain way for the material to survive the wear and tear of the user. Thus, there is a need to provide a new type of support, where the support may be used for any type of upper.

GENERAL DESCRIPTION

In accordance with the present description, there is provided an article of footwear, comprising: an upper having an outer surface, a foot insertion volume and a sole facing surface, a sole assembly comprising: a midsole having a foot facing surface, a ground facing surface, a heel region, forefoot region and an arch region between the heel region and the forefoot region in a longitudinal direction, where the midsole in the arch region comprises a medial support element covering at least a part of the cuboid bone of the foot and/or a lateral support element covering at least a part of the navicular bone, a medial reinforcement member positioned medial to the medial support element and/or a lateral reinforcement member positioned lateral to the lateral support element, where the medial and/or the lateral reinforcement member is configured to increase the rigidity of the medial support element and/or the lateral support element.

Within the understanding of the present disclosure the term rigidity in relation to the support element and the reinforcement member may be understood as rigidness relative to bending force. I.e. the rigidity relates to how easy or hard it is to bend the support element and/or the reinforcement member.

Within the understanding of the present invention, a sole assembly may be seen as having a longitudinal axis, which extends from the heel end of the sole assembly to the toe end of the sole assembly, and extends along the length of the sole assembly. The sole assembly may be divided into separate regions such as the forefoot region, the heel region and an arch region, where each of these regions of the sole assembly may have different functionalities. The regions of the sole assembly may correspond to areas of the foot of the user, so that e.g. the arch region is positioned in the arch area of the foot of the user. The arch region may e.g. function as a part of the midsole that provides support to the arch of the foot, while the heel region may e.g. function as a shock absorber during a heel strike during human gait, while the forefoot area may e.g. provide flexibility for the user to set off. Thus, each region of the sole assembly in the longitudinal direction may have a different function, which may mean that a sole assembly may have different parts having different attributes, and that the regions may be seen in different parts of the sole assembly in a longitudinal direction.

The forefoot region of the sole assembly may be separated from the arch region via a first separation axis, where the first separation axis defines a region between the forefoot region and the arch region. The first separation axis may be seen as an axis that may define a region which defines a boundary between the mechanic attributes of the forefoot region of the sole assembly and the mechanic attributes of the arch region of the sole assembly and/or the heel region of the sole assembly. Thus, as an example the first separation axis may e.g. define a region of the sole assembly where the sole assembly, in a direction from the heel are to the forefoot area, where the sole assembly may transition from a stiff sole assembly to a flexible sole assembly.

The heel region of the sole assembly may be separated from the arch region via a second separation axis, where the first separation axis defines a region between the heel region and the arch region. The second separation axis may be seen as an axis that may define a region which defines a boundary between the mechanic attributes of the heel region of the sole assembly and the mechanic attributes of the arch region of the sole assembly and/or the forefoot region of the sole assembly. Thus, as an example the second separation axis may e.g. define a region of the sole assembly where the sole assembly, in a direction from the heel are to the forefoot area, where the sole assembly may transition from a shock absorbing to a more supportive and/or flexible sole assembly, where the shock absorption is reduced compared to the heel assembly. In one or more examples the transition between the heel region and the arch region may be stiff, i.e. that the bending force in the heel region abutting the second separation axis and the bending force in the arch region abutting the second separation axis is similar and/or equal.

Within the understanding of the present disclosure the bending force may be seen as the amount of energy it takes to compromise an item from its natural shape. The bending force of the sole assembly may be seen as the force needed to bend the sole assembly from its natural position along the longitudinal axis of the sole assembly. The bending force of the support element and/or the reinforcement member may be seen as the force needed to bend the reinforcement member and/or the support element in a radial direction, i.e. from a central axis of the footwear and in a direction outwards and/or inwards. Alternatively, the bending force of the reinforcement member and/or the support element may be in a direction parallel to the longitudinal axis of the sole assembly.

In one or more exemplary embodiments, the first and/or the second separation axis may be in the form of a straight line extending from a medial part of the sole assembly to a lateral part of the sole assembly or may alternatively be a polygonal line extending from a medial part of the sole assembly to a lateral part of the sole assembly.

In footwear production it is common to reinforce the medial and lateral sides of uppers, as there may occur stretching of the upper during use, especially when the medial and lateral sides of the upper are of a flexible material that is capable of elongating during tension. This has traditionally been solved by providing the upper with a non-stretchable material that may extend from the sole abutting part of the upper and towards the eyes used for laces.

This non-stretchable material may be in the form of a reinforcement layer, threads or other mechanical means for reducing the stretch of the upper in the arch and the instep region of the upper. This type of reinforcement may introduce an increase in the cost of the upper in the form of labour cost in applying the reinforcement and/or material costs, and may limit the possibilities of design variations of the upper, requiring the upper to be designed and formed in a certain manner.

In the present disclosure, the provision of the support element on the lateral and/or the medial side of the upper it may be possible to support the lateral and/or the medial side of the foot, when the article of footwear is being worn by the user. The support element provides stability to the foot during use where the support element is provided with a reinforcement member where the combined support element and the reinforcement member support the sides of the foot in the area of the arch region. The support element and the reinforcement member provide may provide barrier in the lateral side and the medial side of the foot, so in order to provide a mechanical boundary and in order to reduce any side movement of the upper relative to the sole and thereby preventing side movement of the foot relative to the sole assembly while the article of footwear is worn by the user.

The support element may have a first bending force where the reinforcement member may have a second bending force, where the second bending force is larger than the first bending force. Optionally, the support element may have a first material hardness and the reinforcement member may have a second material hardness, where the second material hardness is larger than the first material hardness. The cooperation of the support element and the reinforcement member means that the bending force of the support element and the reinforcement member is at least equal to the bending force of the reinforcement member. Thus, when a force is applied to the support element and the reinforcement member, the bending force of the reinforcement member is transferred to the support element, to reduce the willingness of the support element to bend. However, as the reinforcement member which has a higher material hardness compared to the support element, is positioned away from the foot of the user, where the support element is positioned between the foot and the reinforcement member, the wearer of the footwear will only come into contact with the softer support element, and not the harder reinforcement member. the positioned while the support element maintains its material hardness.

Thus, the support element and the reinforcement member of the sole assembly may provide a support to the side areas of the foot, in order to provide a mechanical support to the lateral and/or medial side of the foot during use. Thus, the support element may provide the user with a comfortable support on the lateral and medial side, without it being necessary to provide support across the instep of the foot, as is done for e.g. conventional laced shoes. In conventional laced shoes the laces are tightened, causing an increase in tension of the medial and lateral side of the upper to fix the foot in position relative to the sole assembly, where the increase in tension, the reduced elasticity of the upper and the shape of the upper may cause the user to have discomfort.

The support element may provide a first static counterforce to the foot when the article of footwear is worn by the user, where the reinforcement member may increase the rigidity of the support element to provide an increased counterforce that is applied via the support element. The support element may have a predefined shape which is adapted to hug the foot of the user so that the counterforce of the support element and/or the reinforcement member may prevent lateral movements (movements to the sides) of the foot relative to the sole assembly and/or the upper.

The support element may extend from the midsole and in a direction upwards and towards the instep of the upper and/or the foot during use, where the medial surface of the support element may abut the outer surface of the upper. In addition to extending upwards the support element may curve inwards towards a longitudinal plane, where the curvature may follow the shape of the foot and/or a lasted upper (during manufacturing). The support element may be anchored in the midsole of the sole assembly, where a lower part of the support element is connected and/or integral with the midsole.

By providing an article of footwear having a midsole comprising a support element, it may be possible to manufacture an article of footwear where the upper may be flexible, loose and stretchable without reducing the stability of the article of footwear, as the support element provides a lateral and/or medial support to the foot of the wearer.

The reinforcement member may be a stiffness increasing member, which increases the stiffness and rigidity of the support element. The reinforcement member may be connected to the support element so that the reinforcement member may transfer at least parts of its rigidity to the support element.

Within the meaning of the present invention a longitudinal plane may be a plane that intersects the longitudinal axis of the sole assembly, and may be seen as dividing the sole assembly into a medial part and a lateral part, where the longitudinal plane extends in two dimensions where the first dimension may be seen as the longitudinal axis and the second dimension may be seen as the vertical axis.

In one exemplary embodiment, the medial and/or lateral reinforcement member may extend in a longitudinal direction from a region facing the heel region of the midsole and/or article of footwear towards a region facing a boundary of a forefoot region of the midsole and/or article of footwear. Thus, the reinforcement member may extend continuously and/or unbroken along the arch region of the midsole. The reinforcement member will thereby increase the rigidity of the midsole in a longitudinal direction in the arch region, where the reinforcement member may reduce the risk that the midsole will bend in the arch region in the longitudinal direction, and/or may provide increased support to the arch of the foot during use.

In one exemplary embodiment the reinforcement member and/or any reinforcement member may be absent from the forefoot region of the midsole, and thereby ensuring that the forefoot region of the midsole may bend, and flex freely based on the hardness or rigidity of the midsole material in the forefoot region, and that the reinforcement member will not influence the rigidity of the forefoot area of the midsole.

In one embodiment the medial reinforcement member and/or the lateral reinforcement member may extend in an upwards direction beyond the foot facing part of the midsole, so that the reinforcement member extends in a vertical direction higher than e.g., a central part of the midsole in the vertical direction. Thus, a central part of the midsole (i.e., in a transverse region between the lateral and the medial side)

may have a height that is lower than the height of the reinforcement member. The height of the reinforcement member may especially be higher than the central part of the midsole in the arch region of the sole assembly and/or midsole.

In one or more exemplary embodiments the reinforcement member may cover at least a part of the support element, or may cover the entire support element. The reinforcement member may be coextensive with the support element along the peripheral surface of the support element. Thus, the reinforcement member may in some areas be the outermost surface of the sole assembly, where the reinforcement member may obscure the some of the lateral or/outer surface of the support element.

The support element may be an integral part of the midsole of the shoe, where the midsole material may extend from a toe end of the sole assembly and continuously towards the heel end of the sole assembly, where the support element is provided as part of the midsole material of the sole assembly. The sole assembly may at least partly be manufactured using Direct Injection Moulding, where the midsole material may be injected into a footwear manufacturing mould and upon curing of the material the material defines the midsole as well as the support element. Thus, the support element and the midsole may form a uniform material, i.e. a material that is unbroken. The support element may be formed of the same material as the midsole of the sole assembly, where the material of the midsole extends from a region that is between the foot facing surface and the ground facing surface, and extending in a lateral and/or medial direction and upwards to form the support element.

In one or more exemplary embodiments the support element may be positioned between the upper and the reinforcement member in a radial direction. Thus, the support element may abut the upper on a first side and may abut the reinforcement member on an opposite second side. In one example where the upper may be constructed of a soft material, the support element may provide support to a lateral and/or medial side of the upper, where the second side of the support element may indirectly come into contact with the foot of the wearer, via the upper material. The support element may be made of a material that is softer than the reinforcement member, i.e. have a lower Shore A hardness than the reinforcement member, which means that the softer material of the support element may have a softer feel for the user. This may be the case if the support element is made of a PU while the reinforcement member may be made of a TPU, where the TPU may have a higher rigidity than the PU.

In one or more exemplary embodiments the sole assembly may comprise an outsole, the outsole having a ground facing surface and a midsole facing surface. The outsole may be positioned below the ground facing surface of the midsole, and may e.g. be adapted to provide an increased traction and/or a surface having an increased resistance to wear and tear to the midsole element. This means that the outsole comprises a ground contacting surface for the sole assembly. In one embodiment the ground facing surface of the midsole may be the ground facing surface of the sole assembly, i.e. where the ground facing surface of the midsole may be used as the ground contacting surface of the sole assembly.

In one or more exemplary embodiments the reinforcement member may have a first distal end, a heel end and a toe end, where the first distal end, the heel end and/or the toe end may abut the upper. The reinforcement member may have a body part, where the body part may connect a first distal part, a toe part and/or a heel part to each other, where the first distal end, the toe end and/or the heel end may be the terminal ends of the first distal part, the toe part and/or the heel part. The first distal part, the toe part and the heel part may be at an angle to the body part of the reinforcement member, so that the reinforcement member creates a reinforcement volume which may be capable of enclosing at least a part of the support element. The first distal end, the heel end and/or the toe ends of the reinforcement members may be adapted to abut the outer surface of the upper, such that the body and/or the toe part, heel part and the distal part covers the outer surface of the support element. By providing the toe part, heel part and the distal part at an angle to the body, the rigidity of the support element may be increased, by having two or more surfaces that are angled relative to each other. The body of the reinforcement member and the toe part may have surface areas that are at a different angle to each other, where the angle may be provided in the form of a fold. The same principle may be applied between the body part and the distal part and/or the heel part. In one exemplary embodiment the heel part may be connected to the distal part and/or the toe part may be connected to the distal part. Thus, in one exemplary embodiment the toe part may be connected to the heel part via the distal part.

In one or more exemplary embodiments the medial support element and/or the lateral support element may have a first material hardness and the medial reinforcement member and/or the lateral reinforcement member may have a second material hardness, where the first material hardness is different than the second material hardness. The support element may be mechanically connected to the reinforcement member, so that the hardness of the reinforcement member may be transmitted to the support element and/or vice versa. Thus, the provision of the support element and the reinforcement members in different harnesses it may be possible to manipulate the rigidity of the support element by the mechanical connection to the reinforcement member or vice versa. In an exemplary example where the reinforcement has a high rigidity (material hardness) and the support element has a low rigidity (material hardness), the high rigidity of the reinforcement member may translate into the softer support element, creating a joined element that has a combined rigidity that is higher than the low rigidity of the support element. The opposite may be stated when the support element may have a higher rigidity than the reinforcement member, where the rigidity of the support element may be transferred to the reinforcement member.

In one or more exemplary embodiments the first material hardness may be lower than the second material hardness. By providing a reinforcement member that is more rigid than the support element it may be possible to increase the stiffness of the support element, so that the support element may provide a static and/or active force to the side wall of the upper. Thus, when a user wears a shoe, the support element may abut the side of the foot (through the upper) and the reinforcement member may increase the rigidity of the support element to increase the static counterpressure of the support element. Thus, when the reinforcement member has a higher material hardness and is connected to the support element, an increased force will be required to bend the support element during use. This will therefore provide an increased sense of security when the user wears the article of footwear, as it will require more force to provide lateral movements of the foot relative to the sole assembly, the upper and/or the article of footwear during use.

In one or more exemplary embodiments the medial support element and/or the lateral support element may have a first height, where the first height is higher than the height of the midsole in a central region seen in a lateral direction.

This means that the support element may extend above the central region of the midsole. Thus, a distal end of the support element extends higher in a vertical direction than the central area of the midsole. The distal end of the support element may be the highest point of the midsole in the central area (arch area) of the sole assembly.

In one or more exemplary embodiments the midsole in the heel region may comprise a heel support element covering at least part of the tuberosity of the calcaneus of the foot of the wearer. The heel support element may be a unitary part of the midsole of the sole assembly, where the heel support may be made of the same material as the midsole element. The heel support element may extend upwards in a vertical direction where the heel support element provides support to the heel of the user during gait. The heel support element may provide an increase rigidity to the heel part of the upper, where the heel support element covers at least part of the heel area of the upper, and may optionally be bonded to the heel area of the upper.

In one or more exemplary embodiments the medial support element and/or the lateral support element may have a upper vertical end, where the upper vertical end may be positioned in a region that is between 0-50% of the distance from the upper facing part of the midsole and an instep part of the upper. The instep part of the upper may be seen as the part of the upper that covers the instep of the foot, and may extend from a foot insertion opening and towards the toe end of the foot on the top surface of the upper. The peak of the instep part is approximately at a centre of the top surface of the upper, where the distance from the upper facing part of the midsole to the peak of the instep part has a predefined length for a predefined sized article of footwear. The predefined length between the peak of the instep and the upper facing part of the midsole may be defined as the instep length. Thus, within the context of the present disclosure the support element may extend between 0-50% of the predefined length. Thus, if the predefined length between the peak of the instep and the upper facing part of the midsole is 8 cm, the height of the support element may be between 0 and 4 cm, extending from the upper facing surface of the midsole. The support element may more specifically extend at least 10% of the predefined length, or more specifically at least 20% of the predefined length, or more specifically at least 30% of the predefined length.

In one or more exemplary embodiments the midsole may be direct injection (DIP) moulded to the upper. Direct injection moulding is performed by inserting an upper into a footwear injection mould, where a material is injected into the mould, and the mould is closed. The material expands inside the mould and fills out all areas that are in fluid communication with the volume which the material is injected into. By using direct injection moulding it may be possible to attach the midsole and/or the sole assembly to the upper without the use of any adhesives. Thus, the midsole will be formed to the contours of the parts of the upper which the midsole is attached to. Furthermore, by utilizing direct injection moulding it is possible to attach the reinforcement member to the support element by injecting the support element in the volume between the reinforcement member and the upper. Thus, the material for the midsole will fill out all regions of the shoe injection mould that are accessible by the material. The reinforcement member may be inserted into the mould prior to injection, where the midsole material may be adapted to expand in such a way that the midsole material extends into an area between the upper and the reinforcement member.

The reinforcement member may have an inner surface, where the inner surface may be configured to define at least a part of the outer surface of the support element. Thus, the inner surface of the reinforcement member may have a shape that is identical to at least a part of the outer surface of the support element. Thus, the reinforcement member may define the injection cavity of the support element. The reinforcement member may define the entire outer surface of the support element, where the production of the support element ensures that the midsole material comes into contact with the inner surface of the reinforcement member and when the material has cured, the support element extends between the reinforcement member and the upper, where the reinforcement member is connected to the support element, which in turn is connected to the upper. Thus, the reinforcement member is connected to the upper via the support element.

In one or more exemplary embodiments the material of the midsole may be PU (Polyurethane), where the support element may be PU. In one or more exemplary embodiment the material of the medial reinforcement member and/or the lateral reinforcement member may be TPU (Thermoplastic Polyurethane). The hardness of the TPU of the reinforcement member may be higher than the hardness of the PU, where the joined support element and the reinforcement member may have a hardness that is higher than the hardness of the PU.

In one or more exemplary embodiments the medial support element and/or the lateral support element may extend from the foot facing surface in a vertical direction. The support element may extend upwards from the midsole, where the support element may raise the height of the midsole in the arch area of the sole assembly. The support element may raise upwards to support the sides of the foot, where the support element may be attached to an outer side of the upper, and provide support to the foot of the user during use. The support element may extend vertically upwards.

In one or more exemplary embodiments the medial support element and/or the lateral support element may extend from the foot facing surface in a medial direction. By having the support element extend inwards in a medial direction, the support element may extend inwardly towards a vertical plane that extends along the longitudinal axis of the article of footwear. The medial extension may mean that the support element may follow the shape of the upper and/or the foot of the user, where the foot of the user curves in the medial direction from the sole towards the instep of the foot. The inwards extension of the support element may be adapted to follow the shape of the foot to provide a support in a lateral and/or medial side of the foot in the arch area. I.e. on the side of the foot between the heel and the forefoot area.

In one embodiment the support element may have a curvature that follows the curvature of the outer surface of the upper and/or the outer surface of the foot of the user in an arch region of the article of footwear.

In one or more exemplary embodiments the medial support element and/or the lateral support element may abut the outer surface of the upper. This means that the support element may provide mechanical strength to the upper of the article of footwear. Thus, the provision of the support element may mean that a mechanical strengthening of the upper may not be necessary, as the support element of the midsole provides mechanical strengthening to the side of the upper. Thus, it may not be necessary to provide a strengthening element in order to improve the tensional strength of the upper in the area where e.g. a lacing system is tensioned to achieve support to the side of the foot. The upper of a shoe is adapted to fit the foot of the user, and by having a support element that abuts the upper, the support element provides support to the side of the foot during use. The support element may be configured to increase the resistance in the area where the support element is provided, thereby reducing the tendency of the upper to be forced outwards in a lateral direction as the support element increases provides a counterforce to the side of the upper.

In one or more exemplary embodiments the support element may bond the reinforcement member to the outer surface of the upper. The present disclosure is configured for attaching the reinforcement member to the support element where the support element is bonded on the side which faces the reinforcement member to the reinforcement member. The support element may bond on the opposite side to the upper, so that the reinforcement member is bonded via the support element to the upper. This is particularly when the support element expands into a volume between the upper and the reinforcement member, where the curing of the support element provides a bond between the two surfaces. Thus, the material for the midsole may fill out all regions of the shoe injection mould that are accessible by the material. The reinforcement member may be inserted into the mould prior to injection, where the midsole material may be adapted to expand in such a way that the midsole material extends into an area between the upper and the reinforcement member and bonds the reinforcement member to the upper.

In one or more exemplary embodiments the support element may bond the reinforcement member to the sole assembly. The present disclosure is configured for attaching the reinforcement member to the support element where the support element is bonded on the side which faces the reinforcement member to the reinforcement member. The support element extends from the midsole and ensures that the reinforcement member is attached to the midsole and thereby the sole assembly. This is particularly when the support element expands into a volume defined by the reinforcement member and comes into contact with an inner surface of the reinforcement member.

In one or more exemplary embodiments the medial reinforcement member and/or the lateral reinforcement member may enclose at least part of the lateral surface of the medial support element and/or the lateral support element, respectively, wherein the medial reinforcement member and/or the lateral reinforcement member may optionally enclose the entire lateral surface of the medial support element and/or the lateral support element, respectively. Thus, the reinforcement member may be adapted to cover an outer surface of the support element, where the outermost surface of the sole assembly may be defined by the reinforcement member. Thus, the reinforcement member may e.g. be adapted to protect the material of the support element from wear and tear, as well as from discoloration and/or deterioration. In one example, the reinforcement member may enclose the entire outer surface of the support element, so that the support element may not be visible from the outside of the article of footwear.

In one or more exemplary embodiments the medial support element and/or the lateral support element may extend from ground facing surface of the midsole in a vertical direction Thus, the support element may extend from the ground facing surface of the midsole and upwards, thereby extending the height of the midsole in the area of the support element. The support element may extend from the ground facing surface and extend upwards towards a distal end, where the distal end extends beyond the top surface (upper facing surface) of the midsole. Thus, the distal end of the support element may be the top part of the midsole and/or sole assembly in the arch area of the sole assembly.

In one embodiment, the distal surface of the support element and/or the reinforcement member may be provided with a fixation member. The fixation member may be utilized to attach laces or a tensioning device which is adapted to extend across the instep of the user, from a medial support element or reinforcement member to a distal support element or reinforcement member. Thus, the fixation member device may be adapted to provide mechanical connection to the midsole via the support element and/or the reinforcement member.

In one or more exemplary embodiments a part of the medial support element and/or the lateral support element may have a height in a vertical direction that is at least 150% of the height of the midsole in a central area defined in a lateral direction, or more preferably a height in a vertical direction that may be at least 180% of the height of the midsole in a central area defined in a lateral direction, or more preferably a height in a vertical direction that is at least 200% of the height of the midsole in a central area defined in a lateral direction, or more preferably a height in a vertical direction that is at least 230% of the height of the midsole in a central area defined in a lateral direction. The height may be defined as being the length from the ground facing surface and upwards in a vertical direction.

In one exemplary embodiment the medial reinforcement member and/or the lateral reinforcement member may have a forefoot facing end which is positioned in a region which is between 20 and 40% of the longitudinal length of the outsole assembly from the toe end of the outsole assembly, or more specifically in a region which is between 25 and 35% of the longitudinal length of the outsole assembly from the toe end of the outsole assembly. Thus, the reinforcement member may terminate at a position that faces the forefoot region of the sole assembly, and where the forefoot facing end provides the terminal end of where the increase of rigidity is provided in the sole assembly. The length of the forefoot region of the sole assembly may be up to 40% of the length of the sole assembly, from the toe end towards the arch region. The forefoot facing end of the reinforcement member may e.g. define the end of the arch region of the sole assembly, where the forefoot region of the sole assembly may have a bending force that is lower than the bending force of the arch region.

In one exemplary embodiment the medial reinforcement member and/or the lateral reinforcement member may have a heel facing end which is positioned in a region which is between 10 and 50% of the longitudinal length of the outsole assembly from the heel end of the outsole assembly, or more specifically in a region which is between 20 and 40% of the longitudinal length of the outsole assembly from the heel end of the outsole assembly, or more specifically in a region which is between 25 and 35% of the longitudinal length of the outsole assembly from the heel end of the outsole assembly. Thus, the reinforcement member may terminate at a position that faces the heel region of the sole assembly, and where the heel facing end provides the terminal end of where the increase of rigidity is provided in the sole assembly. The length of the heel region of the sole assembly may be up to 50% of the length of the sole assembly, from the heel end towards the arch region. The heel facing end of the reinforcement member may e.g. define the end of the arch region of the sole assembly, where the heel region of the sole assembly may have a bending force that is lower than the bending force of the arch region. Alternatively the heel facing end may extend into the heel region of the sole assembly, where the arch region and the heel region are reinforced using the reinforcement member, so that the arch region and heel region have a similar bending force, and are of a similar stiffness from the heel region to the arch area.

In one exemplary embodiment the medial reinforcement member and/or the lateral reinforcement member may have had a first wall that extends in a vertical direction and a second wall that extends in a lateral direction. The vertical direction may be in a direction along an outer surface of the upper and/or an outer surface of the midsole. The lateral direction may be a direction that is parallel to a ground contacting surface of the sole assembly. The plane of the first wall may provide a rigidity in one direction, while the plane of the second wall may provide rigidity in a second direction. The rigidity of the reinforcement member may be seen as being at its largest in a direction that is parallel to the plane of the wall of the reinforcement member, where the wall of the reinforcement member may have a higher bending force in a direction that is parallel to the plane of the wall, while the having a lower bending force in a direction that is at an angle to the plane, such as in a direction that is normal to the plane. Thus, the first and the second wall will provide increased bending forces in their respective planes, which provides a higher combined bending force for the reinforcement member.

In one exemplary embodiment the first wall may be connected to the second wall. Thus, the first wall and the second wall may be angled relative to each other, while the walls are connected to each other along an axis that is substantially parallel to the longitudinal axis of the sole assembly. The connection and the angle of the first wall relative to the second wall may increase the rigidity of the reinforcement member, where the second wall increases the rigidity of the first wall in a direction that is normal to the plane of the first wall, and vice versa.

In one exemplary embodiment the medial reinforcement member and/or the lateral reinforcement member may define the lateral outer surface of the sole assembly, optionally in the arch region of the sole assembly. This means that the reinforcement member may define a terminal side wall of the sole assembly in a predefined region of the sole assembly, where the reinforcement member may e.g. provide a dirt and/or damage protection to a side wall of the midsole, where the midsole may be covered by the reinforcement member. The reinforcement member may define an area that may be between 2-15 cm in length and/or 1-5 cm in height, more preferably between 4-10 cm in length and 2 and 4 cm in height. The reinforcement member may extend from the heel region into the arch region of the sole assembly, or from the forefoot area and into the arch are of the sole.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

BRIEF DESCRIPTION OF THE DRAWINGS

The following is an explanation of exemplary embodiments with reference to the drawings, in which.

DETAILED DESCRIPTION

Figure 1:
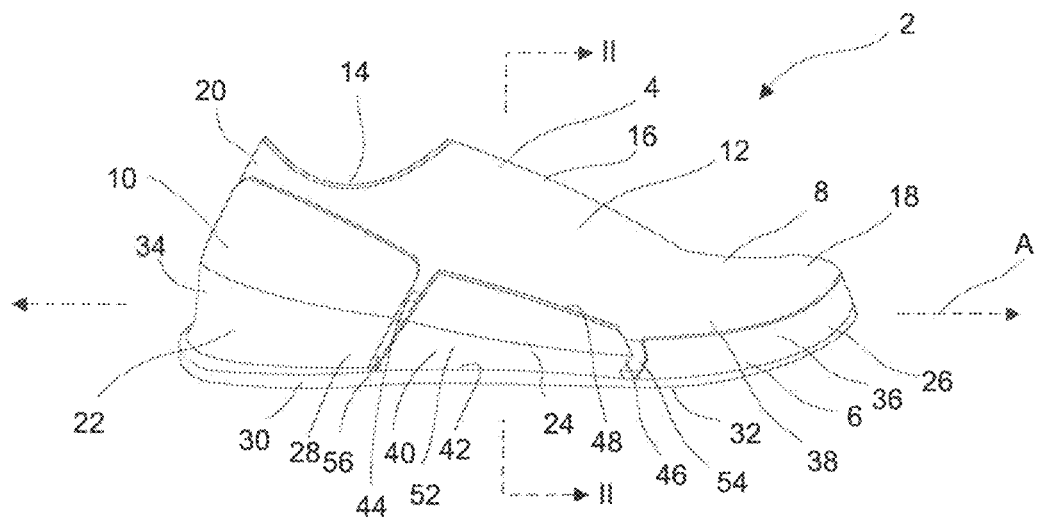
FIG. 1 shows a side view of an exemplary article of footwear.

FIG. 1 shows a side view of an exemplary article of footwear 2, where the article of footwear comprises an upper 4 and a sole assembly 6. The article of footwear may be seen as having a forefoot region 8, a heel region 10 and an arch region 12, where the forefoot region may be seen as a region to accommodate the forefoot of the user, the heel region 10 as the region to accommodate a heel of a user and where the arch region 12 may be seen as a region which accommodates the arch as well as the instep of the user during use. The regions 8, 10, 12 may be seen as separate parts of the article of footwear, in a direction parallel to a longitudinal axis A of the article of footwear, where each region may be seen as having a specific purpose, where the forefoot region 8 may be seen as a flexible area of the footwear, allowing the sole assembly 6 to flex with the foot of the user. The heel region may be seen as the part which provides the initial shock absorption during gait, while the arch region 12 may be seen as a part of the article of footwear 2 which provides the user with support, both to the arch region of the foot, as well as the instep during use.

The upper 4 comprises a heel end 20, a foot insertion opening 14, an instep portion 16, a toe end 18, where the upper 4 may be permanently connected to the sole assembly 6 from the toe end 18 towards the heel end 20 at a ground facing surface (not shown) of the upper 4.

The sole assembly 6 comprises a heel region 22, an arch region 24 and a forefoot region 26, where the arch region 24 is positioned between the heel region 22 and the forefoot region 26 in a direction along the longitudinal axis A. The sole assembly may comprise a midsole 28 which may provide shock absorption as well as an outsole 30 which may provide a ground contacting surface 32. In this exemplary embodiment, the heel region 22 of the sole assembly 6 comprises a heel cap 34, which may provide support to the heel of the user during use, where the heel cap 34 may be unitary with the midsole 28 and may be made of the same material as the midsole 28. The forefoot region 26 may comprise a peripheral part 36, which abuts and is bonded to the outer surface 38 of the upper 4.

The arch region 24 of the sole assembly 6 may comprise a medial support member 40, where the medial support member 40 extends from a ground facing surface 42 of the midsole 28 and upwards along the outer surface 38 of the upper and extends a predefined distance along the surface 38 of the upper 4 in a direction towards the instep portion 16 of the upper 4. The support member 40 may be limited to the arch region of the article of footwear, i.e. where the support member 40 does not extend towards the last 25% of the length of the sole assembly in a longitudinal direction, and/or does not extend into the forward 25% of the length of the sole assembly in a longitudinal direction. Thus, the support member may be outside the heel region 22 and/or the forefoot region 26.

The support member 40 may have a heel end 44 and a toe end 46, as well as a distal end 48, where the support member 40 may have a larger height at the heel end 44 than the toe end 46, where the support member 40 may optionally gradually decrease in height from the heel end 44 towards the toe end 46.

Figure 2:
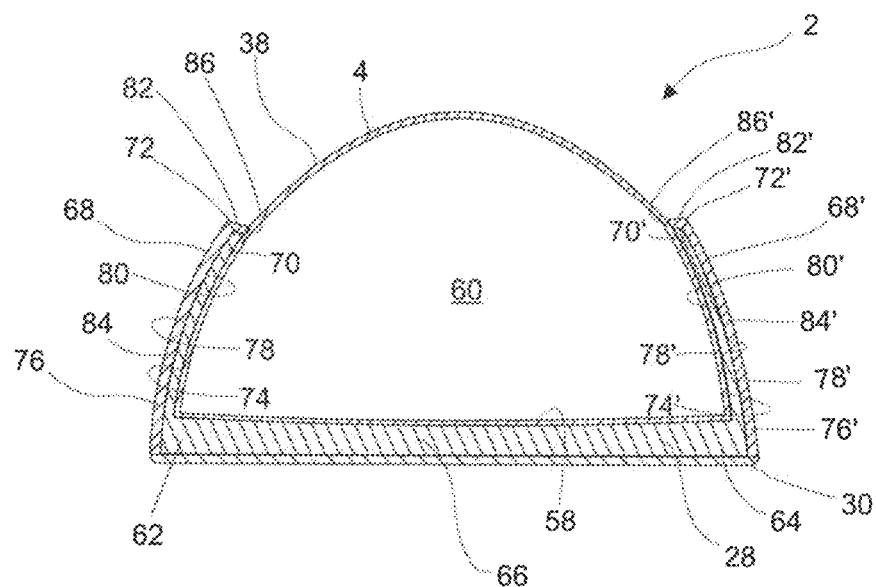
FIG. 2 shows a sectional view of an arch region of an exemplary article of footwear taken along the line II-II.

The support member 40 may comprise a support element 50 (not shown) and a reinforcement member 52, where the support element is part of the midsole 28 of the sole assembly, while the reinforcement member 52 may be a separate element that may be bonded to the support element, as shown in FIG. 2.

The sole assembly 6 may comprise a first flex zone 54, which extends between the forefoot region 26 and the arch region 24, and/or a second flex zone 56 which extends between the heel region 22 and the arch region 24. The first flex zone 54 may be adapted to provide an area of increased or decreased flex between the arch region 24 and the forefoot region 26. The second flex zone 56 may be adapted to provide an area of increased or decreased flex between the arch region 24 and the heel region 22. Thus, in an example, the second flex zone may be adapted to provide decreased flex between the heel region 22 and the arch region 24, which may mean that the arch region 24 and the heel region may have a somewhat uniform flexibility along its length. In one example, the first flex zone 54 may have decreased flexibility, allowing the forefoot region 26 to flex somewhat independently from the arch region 24, i.e. where the forefoot may be capable of flexing or bending at a lower force than e.g. the arch region.

FIG. 2 shows a sectional view of the article of footwear 2 taken along the line II-II of FIG. 1. The upper 4 extends from the foot facing surface 58 of the midsole 28, and defines a part of the foot insertion volume 60 of the article of footwear 2. The midsole 28 has a medial side 62 and a lateral side 64, as well as a central area 66.

The sole assembly 6 may comprise a medial support member 68 (similar to the support member 40 in FIG. 1), where the medial support member comprises a support element 70 which is a unitary part of the medial side 62 of the midsole 28, and extends in an upwards direction from the foot facing surface 58 and terminates in a distal end 72. The support element 70 may be bonded to the outer surface 38 of the upper, providing support to the medial side 74 of the upper 4, and thereby provide support to the foot when it is inside the foot insertion volume 60. The medial support member 68 may further comprise a reinforcement member 76, where the reinforcement member 76 abuts the outer surface 78 of the support element 70, and is bonded to the midsole 28 as well as the support element 70 of the sole assembly 6. The reinforcement member 76 may have an inner surface 80 that is connected to the support element 70 along its vertical length, as well as along its longitudinal length (along longitudinal axis A). The reinforcement member 76 may have a distal part 82, which is at an angle from a body part 84 of the reinforcement member, and terminates in a distal periphery 86 which may abut the outer surface 38 of the upper 4. The reinforcement member 76 may be attached to the midsole 28 via the support element 70, where during manufacturing the support element 70 via direct injection moulding, the support element fills out volume between the reinforcement member 76 and the upper 4, and upon curing attaches the reinforcement member to the upper 4.

The sole assembly 6 may comprise a lateral support member 68' (similar to the support member 40 in FIG. 1), where the lateral support member comprises a support element 70' which is a unitary part of the lateral side 62' of the midsole 28, and extends in an upwards direction from the foot facing surface 58 and terminates in a distal end 72'. The support element 70' may be bonded to the outer surface 38 of the upper, providing support to the lateral side 74' of the upper 4, and thereby provide support to the foot when it is inside the foot insertion volume 60. The lateral support member 68' may further comprise a reinforcement member 76', where the reinforcement member 76' abuts the outer surface 78 of the support element 70', and is bonded to the midsole 28 as well as the support element 70' of the sole assembly 6. The reinforcement member 76' may have an inner surface 80' that is connected to the support element 70' along its vertical length, as well as along its longitudinal length (along longitudinal axis A). The reinforcement member 76' may have a distal part 82', which is at an angle from a body part 84' of the reinforcement member, and terminates in a distal periphery 86' which may abut the outer surface 38 of the upper 4. The reinforcement member 76' may be attached to the midsole 28 via the support element 70', where during manufacturing the support element 70' via direct injection moulding, the support element fills out volume between the reinforcement member 76' and the upper 4, and upon curing attaches the reinforcement member to the upper 4.

The support member 68 may be adapted to provide increase rigidity in a lateral direction, and may be adapted to provide support to the side of the foot of the user during use.

Figure 3:
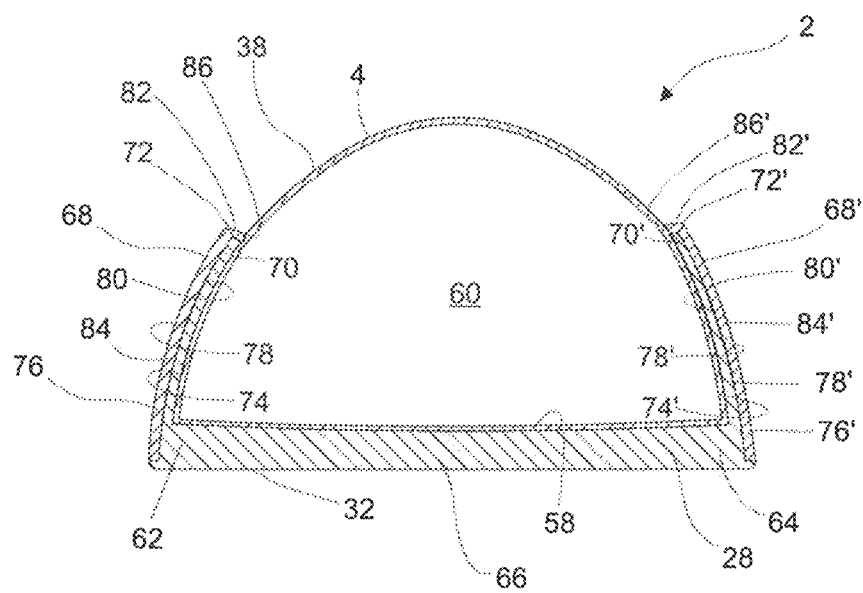
FIG. 3 shows a sectional view of an arch region of an exemplary article of footwear taken along the line II-II.

FIG. 3 shows a similar article of footwear 2 to that shown in FIG. 2, with the exception that the midsole 38 defines the ground contacting surface. The description related to FIG. 2 may be applied similarly in FIG. 3.

Figure 4:
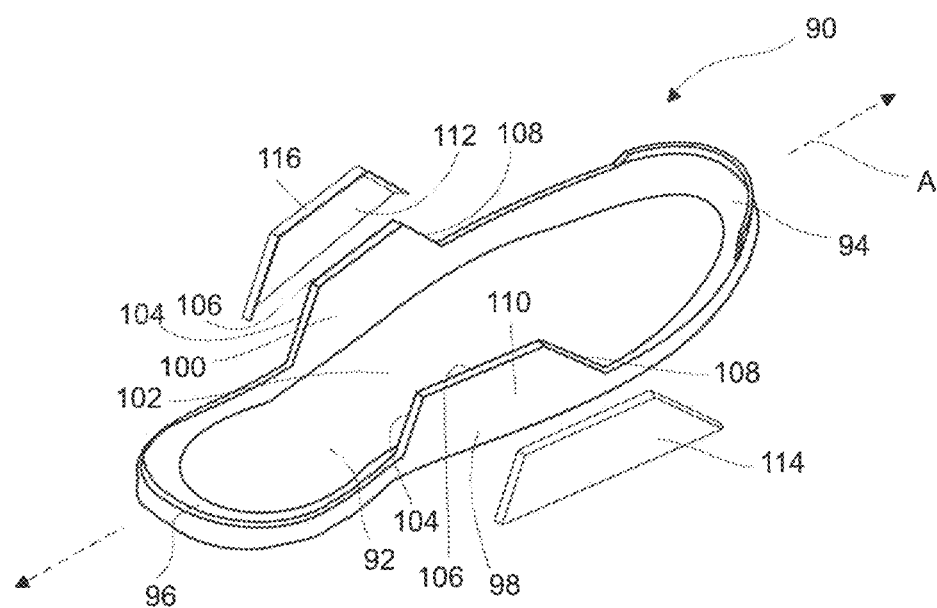
FIG. 4 shows a perspective exploded view of an exemplary sole assembly.

FIG. 4 shows an exploded view of a sole assembly 90 in accordance with the present disclosure, where the sole assembly 90 comprises a midsole 92, which extends from a toe end 94 to a heel end 96 along a longitudinal axis A of the sole assembly. The midsole 92 comprises a medial support element 98 and a lateral support element 100 which are positioned at the peripheral boundary of the arch area 102 of the sole assembly 90. The midsole 92 may be direct injection moulded to an upper (not shown) inside a shoe mold assembly, where the midsole is defined by an empty volume, to which an expanding material may fill up and when the material is cured the midsole will take the shape of the empty volume of the mould. The support element 98 and 100 may comprise a heel end 104, a distal end 106 and a toe end 108, as well as a medial surface 110, where the shape of the support element may be defined by an inner surface 112 of a medial reinforcement member 114 and a lateral reinforcement member 116, respectively. The reinforcement members 112, 114 may be prefabricated, and inserted into a predefined part of a shoe mold, so that the reinforcement members 112, 114 define the shape of the support elements 98, 100, respectively, where the toe end, distal end and heel end are defined by corresponding inner surfaces on the reinforcement members.

Figure 5:
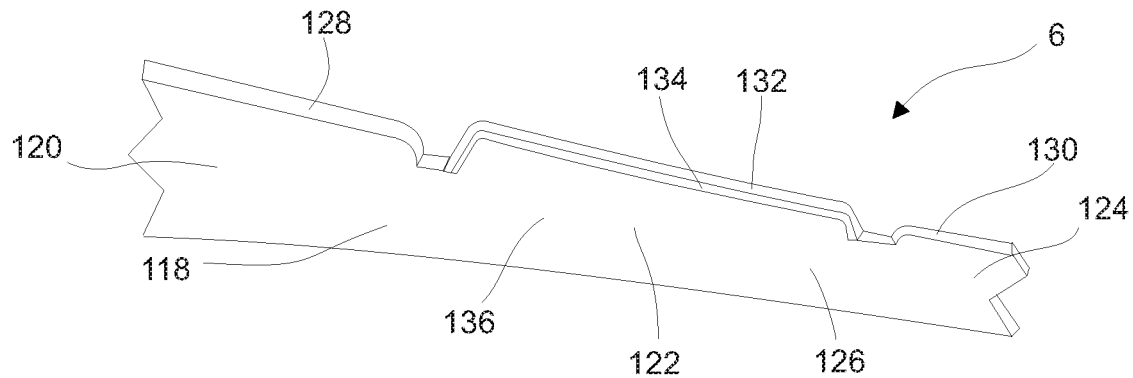
FIG. 5 shows a perspective view of an inner side of a part of an exemplary sole assembly.

FIG. 5 shows an exemplary part of a side periphery 118 of a sole assembly 6 in accordance with the present disclosure, where the side periphery 118 comprises a heel region 120, an arch region 122 and a forefoot region 124. The side periphery 118 may be unitary or integral with the midsole of the sole assembly 6, where the inner surface 126 is configured to bond to an upper (not shown) of an article of footwear. The upper edge 128 of the heel region 120 and the upper edge 130 of the forefoot region may be defined by the shape of a shoe injection mould (not shown) which is clamped to an upper which has been mounted on a last. However, as may be seen, the sole assembly 6 comprises a reinforcement member 132, which has an inner edge 134, where the inner edge 134 is adapted to be in contact with the lasted upper, and where the inner edge and a volume defined by the reinforcement member defines the outer shape of a support element 136, where the support element 136 attaches the reinforcement member 132 to the upper. The reinforcement member 132 may have a higher stiffness than the support element, which means that the arch region 122 of the sole assembly 6 is stiffer than the forefoot region 124 and the heel region 120.

Figure 6:
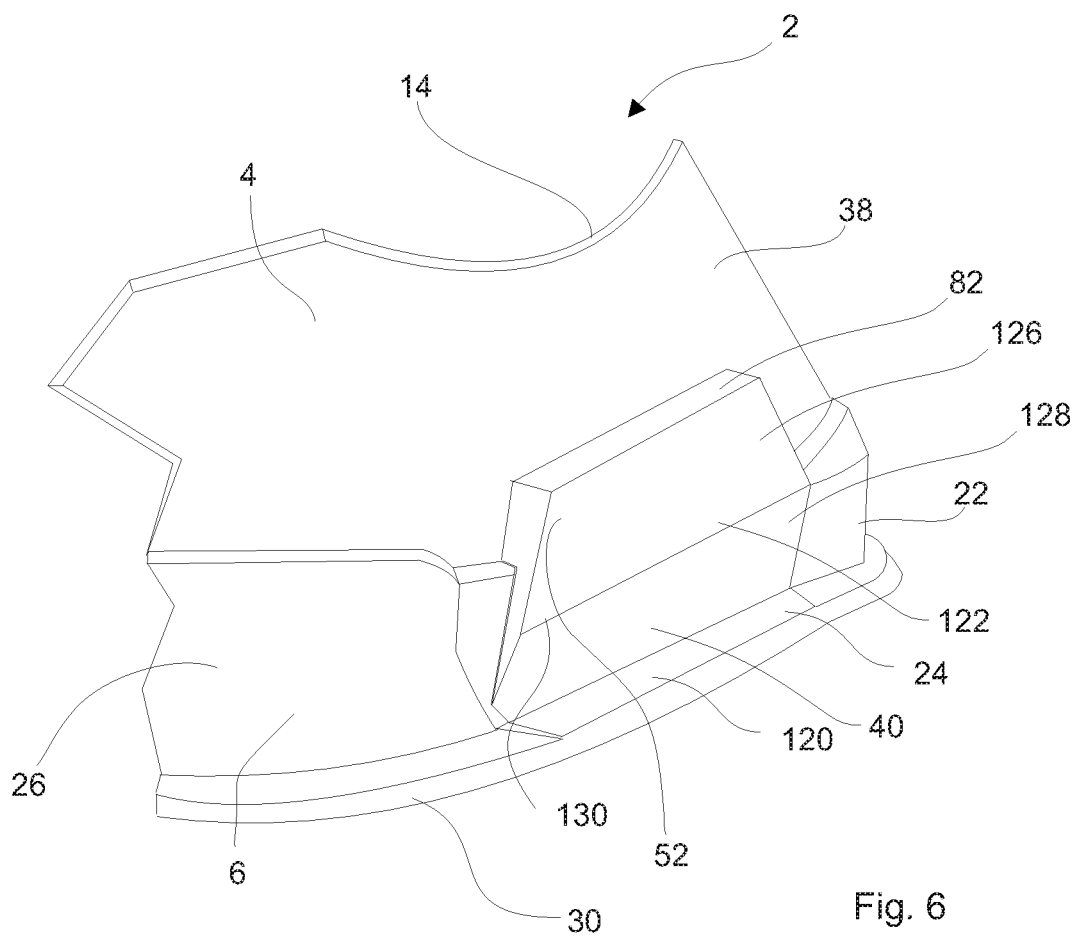
FIG. 6 shows a perspective view of a part of an outer side of an exemplary article of footwear.

FIG. 6 shows a perspective view of a part of an outer side of an exemplary article of footwear 2, having an upper 4 and a sole assembly 6. The reference numbers used in FIG. 6 are the same as shown in FIG. 1 and/or FIG. 2, and the elements shown in FIG. 1 or 2 may also be seen in FIG. 6 even though they are not explicitly named in the following. The sole assembly 6 comprises a heel region 22, an arch region 24 and a forefoot region 26, where the arch region 24 is positioned between the heel region 22 and the forefoot region 26 in a direction along the longitudinal axis A. The sole assembly 6 comprises a support member 40 in the arch region 24, where the support member 40 comprises a reinforcement member 52 and a support element 70 (which cannot be seen) as the reinforcement member 52 covers the entire support element, so that the support element cannot be seen from the outside, but is positioned between the inner surface of the reinforcement member and the outer surface 38 of the upper 4. The reinforcement member 52 may extend from an upper surface 40 of the outsole 30 towards its distal end 82.

Figure 7:
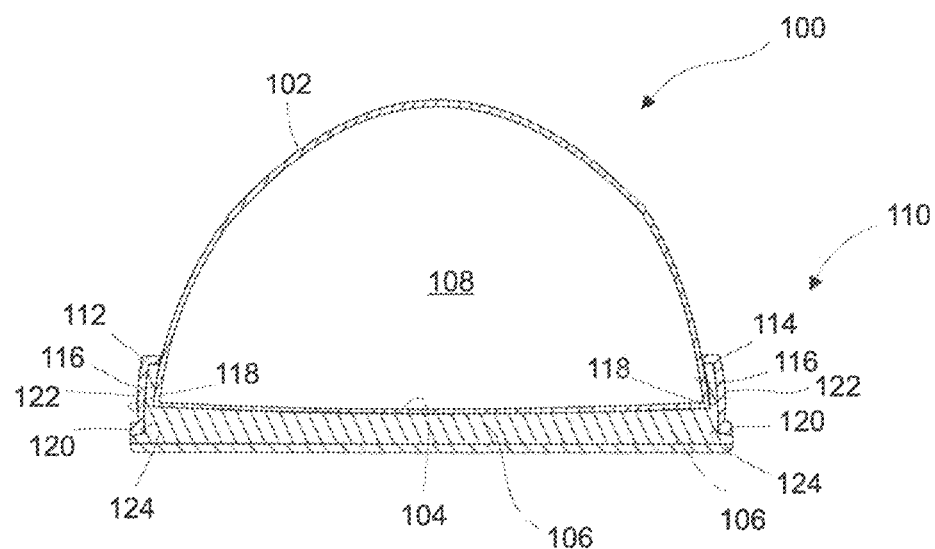
FIG. 7 shows a sectional view of an arch region of an exemplary article of footwear.

FIG. 7 shows a sectional view of an arch region of an exemplary article of footwear 100, where the upper 102 extends from the foot facing surface 104 of the midsole 106 and defines a part of the foot insertion volume 108 of the article of footwear 100.

The sole assembly 110 may comprise a medial reinforcement member 112 and a lateral reinforcement member 114, which has an inner surface 116 which may be bonded to the outer medial and/or lateral surface 118 of the midsole 106. The reinforcement members 112 and 114 may comprise a first wall 120 and a second wall 122, where the first wall 120 provides an increased rigidity in a horizontal direction, while the second wall 122 provides an increased rigidity in a vertical direction. The two walls may be connected to each other via a connecting part 124, which allows the rigidity of one wall to be translated to the second wall, creating a reinforcement member 112, 114 that has rigidity in at least two directions. This may also be seen in FIG. 6.

The second wall 122 shown in FIG. 6 may further comprise an upper wall 126 and a lower wall 128, which may be angled with respect to each other via a middle part 130, so that the second wall may provide reinforcement in two directions that are not parallel to each other, where both directions are different from the direction of the first wall 120.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover all alternatives, modifications, and equivalents.

The invention claimed is:

1. An article of footwear comprising:
an upper having an outer surface, a foot insertion volume, and a sole facing surface, a sole assembly comprising:
a midsole having a foot facing surface, a ground facing surface, a heel region, a forefoot region, and an arch region between the heel region and the forefoot region in a longitudinal direction, where the midsole in the arch region comprises a medial support element configured to cover at least a part of the cuboid bone of the foot or a lateral support element configured to cover at least a part of the navicular bone, and
a medial reinforcement member positioned medial to the medial support element or a lateral reinforcement member positioned lateral to the lateral support element, where the medial reinforcement member or the lateral reinforcement member is configured to increase rigidity of the medial support element or the lateral support element,
wherein the medial reinforcement member and/or the lateral reinforcement member extends in the longitudinal direction towards the forefoot region from a position in the longitudinal direction, which position is less than 40% of a length of the longitudinal length of the sole assembly from a heel end of the sole assembly, and
wherein the upper is configured to connect a part of a medial side of the sole assembly to a part of a lateral side of the sole assembly by a part of the upper positioned above the foot insertion volume.

2. The article of footwear according to claim 1, wherein the medial reinforcement member or the lateral reinforcement member has a first distal end, the heel end and a toe end, where one or more of the first distal end, the heel end, and the toe end abuts the upper.

3. The article of footwear according to claim 1, wherein the medial support element or the lateral support element has a first material hardness and the medial reinforcement member or the lateral reinforcement member has a second material hardness, where the first material hardness is different than the second material hardness.

4. The article of footwear according to claim 3, where the first material hardness is lower than the second material hardness.

5. The article of footwear according to claim 1, wherein the medial support element or the lateral support element has a first height, where the first height is higher than the height of the midsole in a central region in a lateral direction.

6. The article of footwear according to claim 1, wherein the midsole in the heel region comprises a heel support element configured to cover at least part of a tuberosity of the calcaneus of the foot of the wearer.

7. The article of footwear according to claim 1, wherein the medial support element or the lateral support element have an upper vertical end, where the upper vertical end is positioned in a region that is between 0-50% of a distance from the upper facing part of the midsole and an instep part of the upper.

8. The article of footwear according to claim 1, wherein the part of the upper positioned above the foot insertion volume and configured to connect the part of the medial side of the sole assembly to the part of the lateral side of the sole assembly includes a lace for connecting opposing parts of the upper.

9. The article of footwear according to claim 1, wherein a material of the midsole is PU, or the material of the medial reinforcement member and the lateral reinforcement member is TPU.

10. The article of footwear according to claim 1, wherein the medial support element or the lateral support element extends from the foot facing surface in a vertical direction.

11. The article of footwear according to claim 1, wherein the medial support element or the lateral support element extends from the foot facing surface in a medial direction.

12. The article of footwear according to claim 1, wherein the medial support element or the lateral support element abuts the outer surface of the upper.

13. The article of footwear according to claim 1, wherein the medial reinforcement member or the lateral reinforcement member enclose at least part of a lateral surface of the medial support element or the lateral support element, respectively, wherein the medial reinforcement member or the lateral reinforcement member is configured to enclose an entirety of the lateral surface of the medial support element or the lateral support element, respectively.

14. The article of footwear according to claim 1, wherein the medial support element or the lateral support element extends from the ground facing surface of the midsole in a vertical direction.

15. The article of footwear according to claim 1, wherein a part of the medial support element or the lateral support element has a height in a vertical direction that is at least 150% of the height of the midsole in a central area defined in a lateral direction.

16. An article of footwear, comprising:
an upper having an outer surface, a foot insertion volume, and a sole facing surface,
a sole assembly comprising:
    a midsole having a foot facing surface, a ground facing surface, a heel region, a forefoot region, and an arch region between the heel region and the forefoot region in a longitudinal direction, where the midsole in the arch region comprises a medial support element configured to cover at least a part of the cuboid bone of the foot and a lateral support element configured to cover at least a part of the navicular bone, and
    a medial reinforcement member positioned medial to the medial support element and a lateral reinforcement member positioned lateral to the lateral support element, where either the medial reinforcement member is configured to increase the rigidity of the medial support element, the lateral reinforcement member is configured to increase the rigidity of the lateral support element, or both the medial reinforcement member is configured to increase the rigidity of the medial support element and the lateral reinforcement member is configured to increase rigidity of the lateral support element,
wherein the medial reinforcement member and/or the lateral reinforcement member extends in the longitudinal direction towards the forefoot region from a position in the longitudinal direction, which position is less than 40% of a length of the longitudinal length of the sole assembly from the heel end of the sole assembly, and
wherein the upper is configured to connect a part of a medial side of the sole assembly to a part of a lateral side of the sole assembly by a part of the upper positioned above the foot insertion volume.

17. The article of footwear according to claim 16, wherein a part of one or more of the medial support element and the lateral support element has a height in a vertical direction that is at least 150% of the height of the midsole in a central area defined in a lateral direction.

18. The article of footwear according to claim 16, wherein the medial support element and the lateral support element have a first material hardness and the medial reinforcement member and the lateral reinforcement member have a second material hardness, where the first material hardness is different than the second material hardness.

19. The article of footwear according to claim 16, wherein the medial support element and the lateral support element have an upper vertical end, where the upper vertical end is positioned in a region that is between 0-50% of a distance from the upper facing part of the midsole and an instep part of the upper.

20. The article of footwear according to claim 16, wherein one or more of the medial reinforcement member and the lateral reinforcement member has a first distal end, a heel end, and a toe end, where one or more of the first distal end, the heel end, and the toe end abuts the upper.

* * * * *